United States Patent
Kaida

(10) Patent No.: US 7,187,951 B2
(45) Date of Patent: Mar. 6, 2007

(54) MOBILE TELEPHONE, METHOD OF CONTROLLING DISPLAY THEREON, AND PROGRAM FOR SAID METHOD

(75) Inventor: Sou Kaida, Tokyo (JP)

(73) Assignee: NEC Corporation, Tokyo (JP)

( * ) Notice: Subject to any disclaimer, the term of this patent is extended or adjusted under 35 U.S.C. 154(b) by 279 days.

(21) Appl. No.: 10/803,942

(22) Filed: Mar. 19, 2004

(65) Prior Publication Data

US 2004/0192401 A1    Sep. 30, 2004

(30) Foreign Application Priority Data

Mar. 28, 2003    (JP) .............................. 2003-092336

(51) Int. Cl.
  *H04G 7/32*    (2006.01)
(52) U.S. Cl. ............... 455/566; 455/550.1; 455/575.1; 455/575.3; 455/412.1; 455/412.2; 455/90.3; 455/556.2; 379/433.01; 379/433.04; 379/433.11; 345/169; 345/168
(58) Field of Classification Search ............... 455/566, 455/550.1, 575.1, 575.3, 90.1, 90.2, 90.3, 455/564, 412.1, 412.2, 422.1, 403, 500, 517, 455/73, 556.1, 556.2, 557; 379/433.01, 433.04, 379/433.11; 345/156, 473, 168, 169, 552
See application file for complete search history.

(56) References Cited

U.S. PATENT DOCUMENTS

2002/0045467 A1* 4/2002 Hama .......................... 455/567
2003/0153283 A1* 8/2003 Kuwazoe ...................... 455/90

FOREIGN PATENT DOCUMENTS

| CN | 2523132 Y | 11/2002 |
| JP | 2002-281131 A | 9/2002 |

* cited by examiner

*Primary Examiner*—Keith Ferguson
(74) *Attorney, Agent, or Firm*—Sughrue Mion, PLLC

(57) ABSTRACT

Disclosed is a mobile telephone in which content displayed in an auxiliary display area is operatively associated with content displayed in a main display area to make possible more effective utilization of the auxiliary display area. A function that presents a display in the main display area and a function that presents a display in the auxiliary display area can be selected to be the same function, whereby the content displayed in the main display area and the content displayed in the auxiliary display area can be operatively associated at all times. Accordingly, a function for which a display is being presented in the main display area is capable of utilizing the auxiliary display area, thereby making it possible to utilize the auxiliary display area effectively irrespective of whether the mobile telephone is open or closed.

27 Claims, 6 Drawing Sheets

[MAIN DISPLAY AREA]

[AUXILIARY DISPLAY AREA]

CHANGE OVER TASK IN RESPONSE TO INPUT FROM B CONTROL PANEL  《 USE RULE B-1 》

FINALIZE UPON ELAPSE OF T (s) FROM LAST INPUT FROM B CONTROL PANEL  《 USE RULE B-2 》

MOBILE TELEPHONE, METHOD OF CONTROLLING DISPLAY THEREON, AND PROGRAM FOR SAID METHOD

FIELD OF THE INVENTION

This invention relates to a mobile telephone having two display areas, namely a main display area and an auxiliary display area, to a method of controlling the display areas on this telephone, and to a program for this method.

BACKGROUND OF THE INVENTION

As folding mobile telephones become more popular, mobile telephones having two display areas, namely a main display area and an auxiliary display area, are becoming the norm. The auxiliary display area basically is for displaying limited information, such as time and messages giving notification of mail and incoming calls. However, colorization and increase in size of the auxiliary display area have been accompanied by the possibility of displaying more information.

A mobile communication device disclosed in the specification of JP Patent Kokai Publication JP-P2002-281131A is known as an example of the prior art related to content displayed in both main and auxiliary display areas.

According to the art disclosed in the above-mentioned specification, if a mobile telephone is in the closed or folded state and no response is made to an incoming call, then the date and time of the incoming call and the telephone number of the calling party are displayed in the auxiliary display area. If the mobile telephone is opened or unfolded, information such as the telephone number that was being displayed in the auxiliary display area is displayed in the main display area. Further, if the mobile telephone is in the closed or folded state and e-mail is received, then information such as the name of the sender is displayed in the auxiliary display area. If the mobile telephone is opened or unfolded, then the information that was being displayed in the auxiliary display area and information such as the body of the e-mail is displayed in the main display area.

[Patent Document 1]

JP Patent Kokai Publication JP-P2002-281131 A

SUMMARY OF THE DISCLOSURE

Though it is likely that there will be greater utilization of the auxiliary display area as the auxiliary display area is colorized and increased in size, it is also conceivable that candidates for display in the auxiliary display area will become more diverse as mobile telephones are afforded with greater functionality.

Accordingly, an object of the present invention is to provide a mobile telephone in which content displayed in an auxiliary display area is made to operate in association with content displayed in a main display area to enable more effective utilization of the auxiliary display area, a method of controlling the displays presented in these display areas, and a program for this method.

According to the present invention, the foregoing object is attained by providing a mobile telephone having main display means, auxiliary display means and control means for executing processing based upon a program that has been stored in the mobile telephone to thereby implement a plurality of functions, wherein display content that is the result of processing by the same function is displayed on both the main display means and the auxiliary display means.

In a preferred embodiment, the control means exercises control so as to assign priorities to the plurality of functions separately for each of the main and auxiliary display means, thereby managing functions that process display content displayed on the main and auxiliary display means, and present displays in order starting from display content that has been processed by a function having the highest priority.

In a preferred embodiment, the mobile telephone further includes auxiliary operation input means capable of selecting a function that processes display content displayed on the auxiliary display means, wherein the control means exercises control in such a manner that if a function is selected by the auxiliary operation input means, the priority of this selected function for display on the main display means is changed to the highest priority and display content that has been processed by this selected function is displayed also on the main display means.

In a preferred embodiment, the control means exercises control so as to count, for each of the plurality of functions, the number of times the function has been selected by the auxiliary operation input means, and change the priority for presentation of displays on the auxiliary display means in accordance with the number of times the function has been selected.

In a preferred embodiment, the control means exercises control so as to measure, for each of the plurality of functions, display time during which display content that has been processed by the function is displayed on the auxiliary display means, and change the priority for presentation of displays on the auxiliary display means in accordance with the display time measured.

In a preferred embodiment, the control means exercises control so as to count, for each of the plurality of functions, the number of times the function has been selected by the auxiliary operation input means; and if a function is selected by the auxiliary operation input means, count the selected function, change the priority of this selected function for display on the auxiliary display means to the highest priority and assign the priorities of the other functions in accordance with the number of times the function has been selected.

In a preferred embodiment, the control means exercises control so as to measure, for each of the plurality of functions, display time during which display content that has been processed by the function is displayed on the auxiliary display means; and if a function is selected by the auxiliary operation input means, change the priority of this selected function for display on the auxiliary display means to the highest priority and assign the priorities of the other functions in accordance with the display time measured.

In a preferred embodiment, the mobile telephone further includes main operation input means capable of selecting a function that processes display content displayed on the main display means, wherein the control means exercises control so as to count, for each of the plurality of functions, the number of times the function has been selected by the main operation input means; and if a function is selected by the main operation input means, change the priority of this selected function for display on the auxiliary display means to the highest priority and assign the priorities of the other functions in accordance with the number of times the function has been selected.

In a preferred embodiment, the mobile telephone further includes main operation input means capable of selecting a function that processes display content displayed on the main display means, wherein the control means exercises control so as to measure, for each of the plurality of functions, display time during which display content that has been processed by the function is displayed on the auxiliary display means; and if a function is selected by the main operation input means, change the priority of this selected function for display on the auxiliary display means to the highest priority and assign the priorities of the other functions in accordance with the display time measured.

According to another aspect of the present invention, the foregoing object is attained by providing a method of controlling display on a mobile telephone having main display means, auxiliary display means and control means for executing processing based upon a program that has been stored in the mobile telephone to thereby implement a plurality of functions, the method including a control step of exercising control in such a manner that display content that is the result of processing by the same function is displayed on both the main display means and the auxiliary display means.

In a preferred embodiment, control is exercised so as to assign priorities to the plurality of functions separately for each of the main and auxiliary display means, thereby managing functions that process display content displayed on the main and auxiliary display means, and present displays in order starting from display content that has been processed by a function having the highest priority.

In a preferred embodiment, control is exercised in such a manner that if a function that processes display content displayed on the auxiliary display means is selected by input means, the priority of this selected function for display on the main display means is changed to the highest priority and display content that has been processed by this selected function is displayed also on the main display means.

In a preferred embodiment, control is exercised so as to count, for each of the plurality of functions, the number of times the function has been selected by the input means, and change the priority for presentation of displays on the auxiliary display means in accordance with the number of times the function has been selected.

In a preferred embodiment, control is exercised so as to measure, for each of the plurality of functions, display time during which display content that has been processed by the function is displayed on the auxiliary display means, and change the priority for presentation of displays on the auxiliary display means in accordance with the display time measured.

In a preferred embodiment, control is exercised so as to count, for each of the plurality of functions, the number of times the function has been selected by the input means; and if a function is selected by the input means, count the selected function, change the priority of this selected function for display on the auxiliary display means to the highest priority and assign the priorities of the other functions in accordance with the number of times the function has been selected.

In a preferred embodiment, control is exercised so as to measure, for each of the plurality of functions, display time during which display content that has been processed by the function is displayed on the auxiliary display means; and if a function is selected by the input means, change the priority of this selected function for display on the auxiliary display means to the highest priority and assign the priorities of the other functions in accordance with the display time measured.

In a preferred embodiment, control is exercised so as to count, for each of the plurality of functions, the number of times a function that processes display content displayed on the auxiliary display means has been selected; and if a function that processes display content displayed on the main display means is selected, change the priority of this selected function for display on the auxiliary display means to the highest priority and assign the priorities of the other functions in accordance with the number of times the function has been selected.

In a preferred embodiment, control is exercised so as to measure, for each of the plurality of functions, display time during which display content that has been processed by the function is displayed on the auxiliary display means; and if a function that processes display content displayed on the main display means is selected, change the priority of this selected function for display on the auxiliary display means to the highest priority and assign the priorities of the other functions in accordance with the display time measured.

According to another aspect of the present invention, the foregoing object is attained by providing a program for controlling display on a mobile telephone having main display means, auxiliary display means and control means for executing processing based upon a program that has been stored in the mobile telephone to thereby implement a plurality of functions, the program implementing control in such a manner that display content that is the result of processing by the same function is displayed on both the main display means and the auxiliary display means.

In a preferred embodiment, control is implemented so as to assign priorities to the plurality of functions separately for each of the main and auxiliary display means, thereby managing functions that process display content displayed on the main and auxiliary display means, and present displays in order starting from display content that has been processed by a function having the highest priority.

In a preferred embodiment, control is implemented in such a manner that if a function that processes display content displayed on the auxiliary display means is selected by input means, the priority of the selected function on the main display means is changed to the highest priority and display content that has been processed by the selected function is displayed also on the main display means.

In a preferred embodiment, control is implemented so as to count, for each of the plurality of functions, the number of times the function has been selected by the input means, and change the priority for presentation of displays on the auxiliary display means in accordance with the number of times the function has been selected.

In a preferred embodiment, control is implemented so as to measure, for each of the plurality of functions, display time during which display content that has been processed by the function is displayed on the auxiliary display means, and change the priority for presentation of displays on the auxiliary display means in accordance with the display time measured.

In a preferred embodiment, control is implemented so as to count, for each of the plurality of functions, the number of times the function has been selected by the input means; and if a function is selected by the input means, count the selected function, change the priority of this selected function for display on the auxiliary display means to the highest priority and assign the priorities of the other functions in accordance with the number of times the function has been selected.

In a preferred embodiment, control is implemented so as to measure, for each of the plurality of functions, display time during which display content that has been processed by the function is displayed on the auxiliary display means;

and if a function is selected by the input means, change the priority of this selected function for display on the auxiliary display means to the highest priority and assign the priorities of the other functions in accordance with the display time measured.

In a preferred embodiment, control is implemented so as to count, for each of the plurality of functions, the number of times a function that processes display content displayed on the auxiliary display means has been selected; and if a function that processes display content displayed on the main display means is selected, change the priority of this selected function for display on the auxiliary display means to the highest priority and assign the priorities of the other functions in accordance with the number of times the function has been selected.

In a preferred embodiment, control is implemented so as to measure, for each of the plurality of functions, display time during which display content that has been processed by the function is displayed on the auxiliary display means; and if a function that processes display content displayed on the main display means is selected, change the priority of this selected function for display on the auxiliary display means to the highest priority and assign the priorities of the other functions in accordance with the display time measured.

Other features and advantages of the present invention will be apparent from the following description taken in conjunction with the accompanying drawings, in which like reference characters designate the same or similar parts throughout the figures thereof.

PREFERRED EMBODIMENTS OF THE INVENTION

Figure 1:
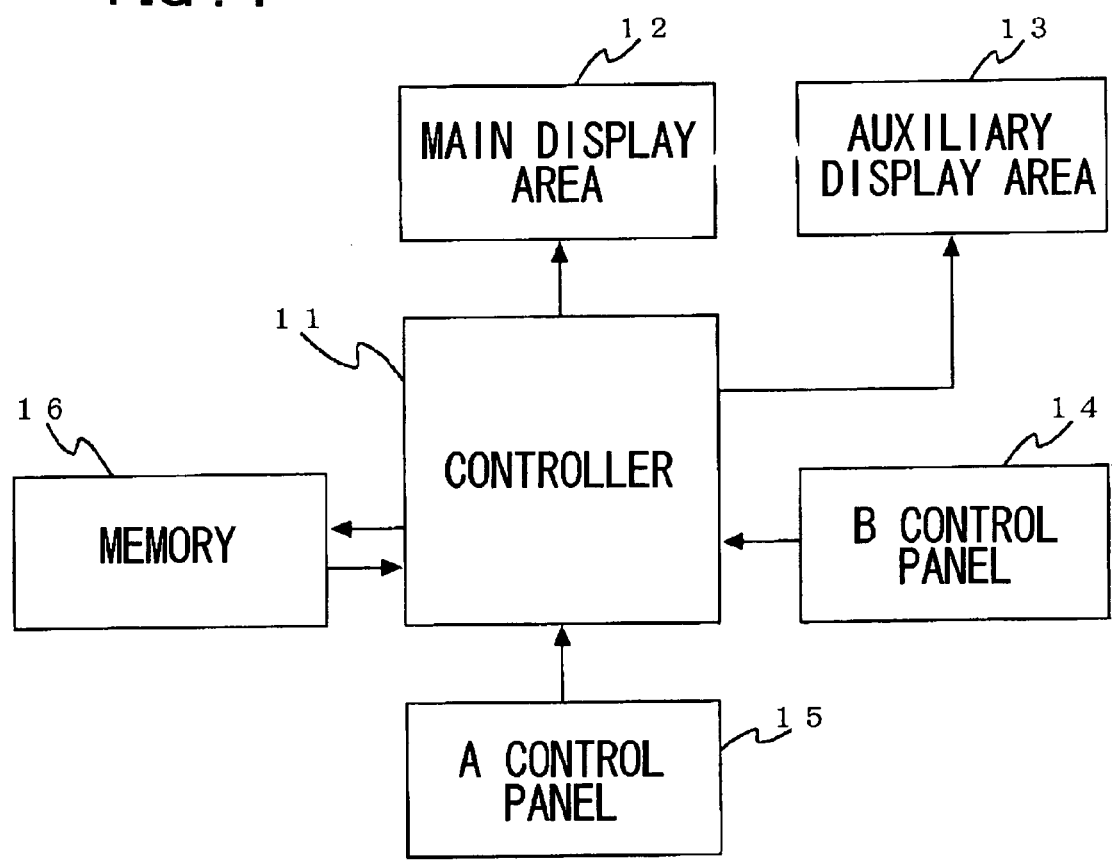
FIG. 1 is a block diagram illustrating the structure of a mobile telephone according to an embodiment of the present invention.

Reference will now be had to the accompanying drawings of FIGS. 1 to 6 to describe a preferred embodiment of a mobile telephone according to the present invention, as well as a method of controlling displays presented by the mobile phone and a program for this method according to the present invention.

The structure of this embodiment will be described first with reference to FIG. 1. The mobile telephone according to this embodiment includes a controller 11 for controlling the operation of the mobile telephone, a main display area 12 for displaying main images of various tasks and information, etc., an auxiliary display area 13, which is a display area that supplements the main display area 12, a B control panel 14 that the operator uses while observing the auxiliary display area 13, an A control panel 15 that the operator uses while observing the main display area 12, and a memory 16 for holding information.

Figure 2:
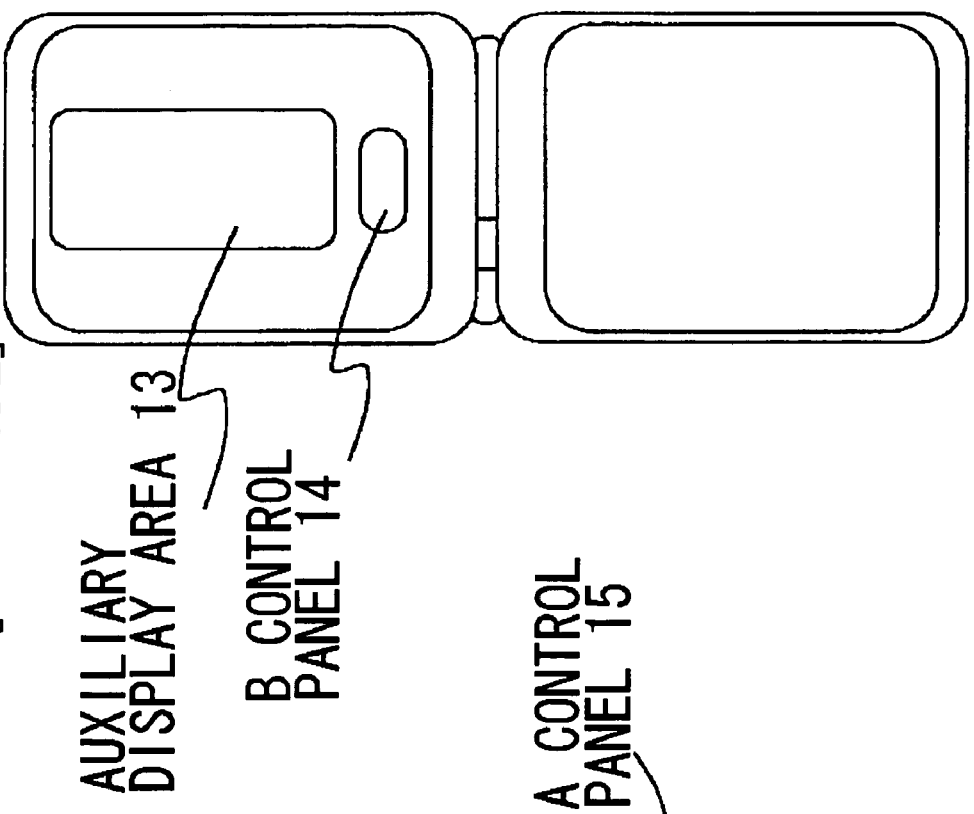
FIG. 2 is a diagram illustrating the external appearance of the mobile telephone according to this embodiment.
Figure 2:
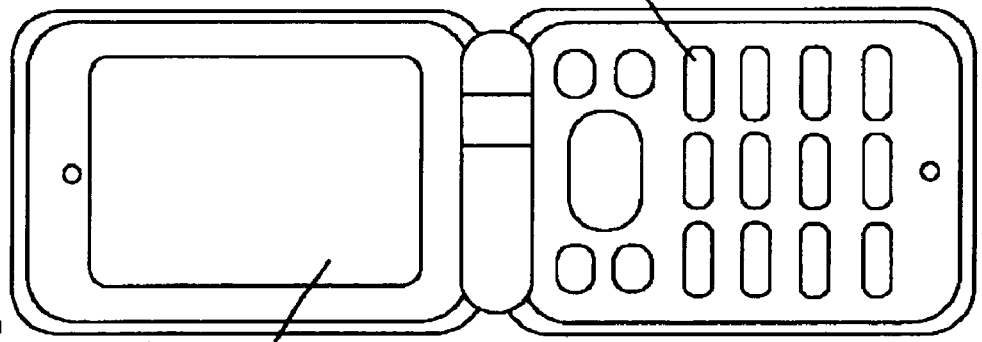

The external appearance of the mobile telephone having a folding mechanism is illustrated in FIG. 2. The main display area 12 and the A control panel 15 are disposed on the front side of the mobile telephone and are made to face each other by folding up the mobile telephone to close it. The auxiliary display area 13 and the B control panel 14 are disposed on the back side and constitute a viewable display area and an operable control panel, respectively, when the mobile telephone is closed by being folded.

Thus, the present embodiment is a mobile telephone having two display areas, namely main and auxiliary display areas. The mobile telephone supports multitasking and is capable of starting up and operating a plurality of functions (tasks) simultaneously. The mobile telephone is characterized in that an order of priority is provided for tasks output to the main display area 12 and for tasks output to the auxiliary display area 13, and in that the mobile telephone includes means for operatively associating the highest-priority task of the main display area 12 and the highest-priority task of the auxiliary display area 13 and outputting this task to both display areas; means for deciding the order of priority of displays presented on the auxiliary display area 13 using frequencies of display of each of the tasks; means for changing over the display of the auxiliary display area 13 in order from tasks of high display frequency in response to an input from the B control panel 14 adjacent the auxiliary display area 13, and simultaneously operatively associating the task output to the main display area 12. It should be noted that a task refers to a function of the mobile telephone implemented by having the controller 11 execute processing in accordance with a program stored in the memory 16.

A procedure for deciding data output to the main display area 12 and auxiliary display area 13 will be described with reference to FIG. 3.

Control starts in response to an input from a control panel (the A control panel 15 or the B control panel 14) or occurrence of a mobile-telephone event (an incoming call, receipt of e-mail, etc.) (step S101). Since a plurality of tasks are launched in multitasking, each task is assigned a priority. The priorities of the tasks that were stored in memory 16 the last time operation ended are read in from the memory 16 by the controller 11 (step S102). Here it is assumed that the priorities of tasks for which processing is executed to present displays on the display areas are provided separately for the main display area 12 and auxiliary display area 13, that the priorities of tasks that present displays on the main display area 12 are M1, M2, M3, M4, . . . in descending order, and that the priorities of tasks that present displays on the auxiliary display area 13 are S1, S2, S3, S4, . . . in descending order. Further, it is assumed that the auxiliary display area 13 is provided with frequencies of display in addition to order of priority and that the frequencies with which displays are presented in response to a task changeover input from the B control panel 14 are U1, U2, U3, U4, . . . in descending order.

Next, if start of control was the event occurrence (an incoming call, receipt of e-mail, etc.) ("YES" at step S103), then the controller 11 re-calculates the priorities of the tasks from the priorities of the tasks that were read in from the memory 16 (step S104). The priorities of the tasks at the occurrence of the event differ from one another and priorities conforming to the tasks are assigned (step S104). For example, if an event which is receipt of e-mail or an incoming call has occurred, then a mailer task or a telephone task is changed to the highest-priority task in such a manner that the transmission source of the e-mail or the calling party will be displayed in the auxiliary display area 13.

Next, if there is a task changeover input from the B control panel 14, which is capable of changing over the display of the auxiliary display area 13 ("YES" at step S105), then the controller 11 reshuffles the priorities of the tasks in accordance with a Rule B-1, illustrated below (step S106). In order to simplify the description, it will be assumed in an example below that in a state where four tasks [A (mailer), B (browser), C (Java application), D (telephone)] have been started up, the task order of priority of the main display area 12 is M1: A (mailer), M2: B (browser), M3: C (Java), M4: D (telephone), that the task order of priority of the auxiliary display area 13 is S1: A (mailer), S2: C (Java), S3: B (browser), S4: D (telephone), and that display frequency of the auxiliary display area 13 is U1: C(Java), U2: A (mailer), U3: B (browser), U4: D (telephone). In response to an input from the B control panel 14 a single time, the order of priority of the auxiliary display area 13 is reshuffled (see FIG. 4) in such a manner that the task that was at priority S1 is shifted to a task of the lowest priority (S1: A→S4: A) while the priorities of the other tasks are each moved up by one (S2: C→S1: C, S3: B→S2: B, S4: D→S3: D). The reason for shifting the task that was at priority S1 to a task of the lowest priority is that the task that was at priority S1 is one for which a display was being presented before the input from the B control panel 14 was made. On the other hand, the order of priority of the main display area 12 is reshuffled in such a manner that the C (Java) task that became priority S1 in the order of priority of the auxiliary display area 13 is shifted to priority M1 (M3: C→M1: C) while the priorities of the other tasks are each moved down by one (M2: B→M3: B, M1: A→M2: A) so as to fill in the hole left at M3 that was the priority of the C (Java) task. According to this rule, M1 and S1, which are the highest priorities, always become assigned to the same task. The above-described rule shall be referred to as "Rule B-1".

If successive inputs from the B control panel 14 are made, reshuffling of the priorities according to Rule B-1 is repeated. Further, if a task changeover input is made not by the B control panel 14 but by the A control panel 15 that depends upon the main display area 12 ("YES" at step S107), then reshuffling of task priorities is performed in accordance with a Rule A described below (step S108).

Figure 5:
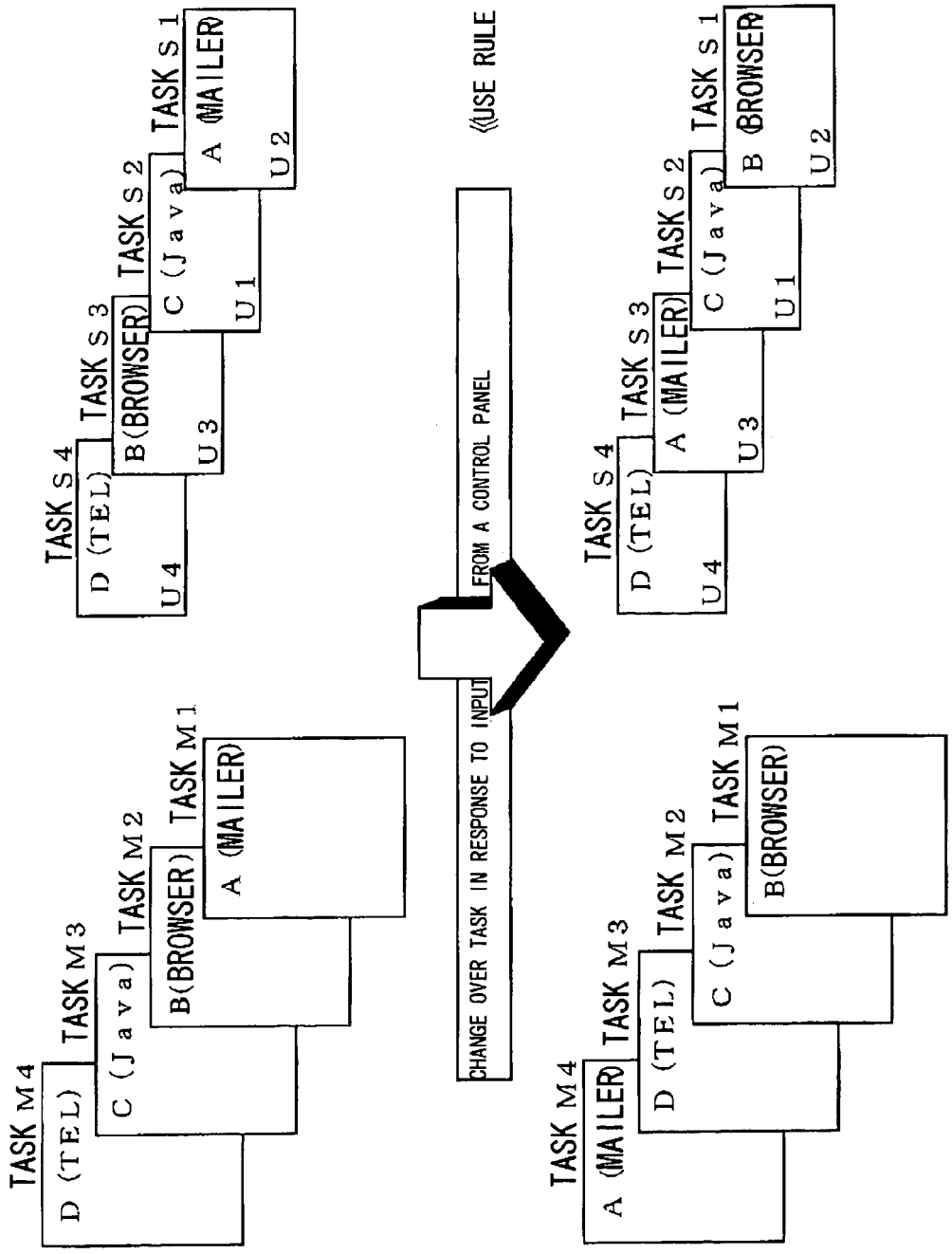
FIG. 5 is a diagram illustrating an example of displays presented on main and auxiliary display areas according to this embodiment.

Rule A will be described with reference to FIG. 5. It will be assumed that the initial state, such as the tasks that have been started up, the priorities of the tasks and the frequencies of display, is the same as that described above in connection with Rule B-1. In response to an input from the A control panel 15 a single time, the order of priority of the main display area 12 is reshuffled in such a manner that the task that was at priority M1 is shifted to a task of the lowest priority (M1: A→M4: A) while the priorities of the other tasks are each moved up by one (M2: B→M1: B, M3: C→M2: C, M4: D→M3: D). Further, the order of priority of the auxiliary display area 13 is reshuffled in such a manner that the B (browser) task that became priority M1 in the order of priority of the main display area 12 is made priority S1 (S3: B→S1: B). The task priorities from S2 onward are assigned from top down to the tasks in order of descending display frequency thereof (S2: C [U1]→S2: C [U1], S1: A [U2]→S3: A [U2], S4: D[U4]→S4 D [U4]). In this rule also M1 and S1, which are the highest priorities, always become assigned to the same task. The above-described rule shall be referred to as "Rule A".

With reference again to FIG. 3, if there is no input from the B control panel 14 within a fixed period of time T [s] (e.g., 20 s) from the last input from the B control panel 14 ("YES" at step S109), then a Rule B-2 illustrated below is applied to finalize the order of priority of the auxiliary display area 13. Rule B-2 will be described with reference to the flowchart of FIG. 6 and FIG. 4.

Rule B-2 changes the order of priority of the auxiliary display area 13 without making any further change to the order of priority of the main display area 12. First, the S1-priority task of the auxiliary display area 13 is left unchanged and priorities are assigned from top down to the tasks of priority S2 onward in order of descending display frequency thereof.

Each task is provided with a variable u (an integer) serving as a variable for deciding frequency of display, and the variable u of the task of priority S1 is incremented at the moment Rule B-2 is applied (step S201). The display frequencies U1, U2, U3 . . . are assigned from top down to tasks in order of decreasing variable u of the launched tasks (step 202). Next, the S1-priority task of the auxiliary display area 13 is left unchanged and priorities are assigned from top down to the tasks of priority S2 onward in order of descending display frequency thereof (S4: A [U2]→S2: A [U2], S2: B [U3]→S3: B [U3], S3: D [U4]→S4: D [U4]) (step S203). The order of priority of the auxiliary display area 13 is finalized by the above-described procedure.

The priorities that have been changed by Rules A, B-1 and B-2 are written to the memory 16 (step S204). The display content based upon the M1-priority task is displayed in the main display area 12 and the display content based upon the S1-priority task is displayed in the auxiliary display area 13 (step S205).

Thus, this embodiment is such that the same task can be selected as the task that presents a display in the main display area 12 and as the task that presents a display in the auxiliary display area 13, whereby the content displayed in the main display area 12 and the content displayed in the auxiliary display area 13 can be operatively associated at all times. Accordingly, a task for which a display is being presented in the main display area 12 is capable of utilizing the auxiliary display area 13, thereby making it possible to utilize the auxiliary display area 13 effectively irrespective of whether the mobile telephone is open or closed.

Further, an input from the B control panel 14 provided adjacent the auxiliary display area 13 makes it possible to make an output to and present a display in the auxiliary display area 13 in order from tasks having a higher frequency of display and therefore a display based upon a task that has a high probability of being the candidate sought by the user can be presented quickly.

Furthermore, a task that has been changed over by the B control panel 14 and presents a display in the auxiliary display area 13 is made to operate in association with a task that presents a display in the main display area 12. This makes possible a use in which after the user checks the display in the auxiliary display area 13, the user immediately checks the details of the same display content in the main display area 12.

Further, the rules for deciding the priorities of displays presented on the auxiliary display area 13 have little dependence upon the rules for deciding the priorities of displays presented on the main display area 12. As a result, it is possible for concurrent use to be made of other priority deciding rules regarding the main display area 12. This provides a high degree of universality.

The above-described embodiment is a preferred embodiment of the present invention. However, the present invention is not limited to this embodiment and can be modified in various ways without departing from the gist of the present invention. For example, in the embodiment above, the method of calculating frequencies of displays presented in the auxiliary display area 13 is to use the number of times a task becomes the highest-priority task at the moment a changeover is decided and assign the display frequencies U1, U2, U3 ... from top down to tasks in order of decreasing number of times the tasks became the highest-priority task. However, another conceivable method is to retain, for each task, the length of time the task has presented a display in the auxiliary display area 13 and assign the display frequencies U1, U2, U3 ... from top down to tasks in order of decreasing lengths of time the tasks presented displays in the auxiliary display area 13. In this case, since display time would become an extremely large value if it were simply allowed to continue adding up, display time is reset at fixed intervals. This method entails retaining an initial display time period that prevailed when the previous setting was made, calculating a difference obtained by subtracting the preceding initial display time period from the present display time period and resetting the difference as the display time period (the initial display time period). In other words, time added on since the previous setting becomes the initial display time period. Time during which a task is currently presenting a display begins to be added to this initial display time period and the sum is adopted as the length of display time used to determine frequency of display. By using length of display time in calculation of display frequency, the priority of the task for which a display is most usually presented can be raised.

Further, in the description rendered above, other tasks are each moved down one rank so as to fill the hole left by a task whose priority was shifted to M1 with regard to the main display area 12 in accordance with Rule B-1. However, this operation is only one example and depends upon the main-display priority deciding rule for when a task chosen for priority S1 (the highest priority in regard to the auxiliary display area 13) from among a plurality of tasks is selected for priority M1 (the highest priority in regard to the main display area 12) in the main display area 12. Accordingly, it is also permissible to adopt a method in which a task whose priority was M1 is shifted to priority M4 (the lowest priority) and the other tasks are each moved up one rank so as to fill the hole left by the task whose priority was shifted to M1.

Figure 3:
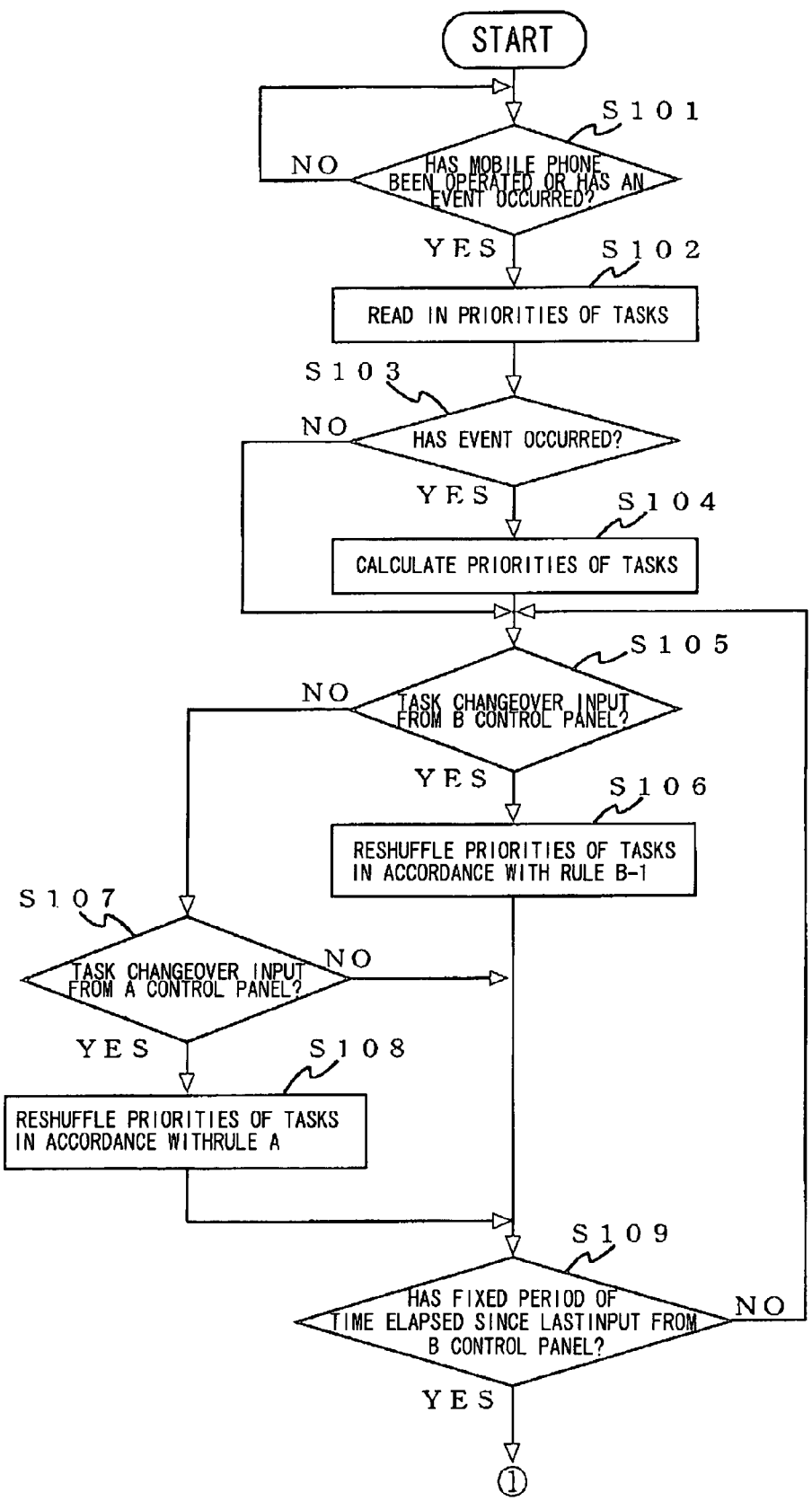
FIG. 3 is a flowchart illustrating an operating procedure according to this embodiment.
Figure 4:
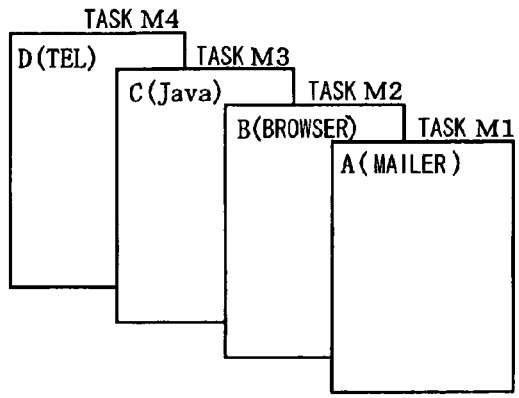
FIG. 4 is a diagram illustrating an example of displays presented on main and auxiliary display areas according to this embodiment.
Figure 4:
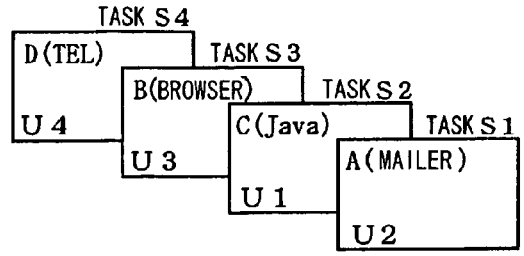
Figure 4:
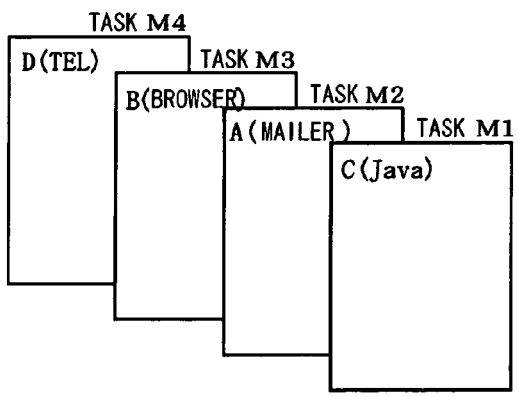
Figure 4:
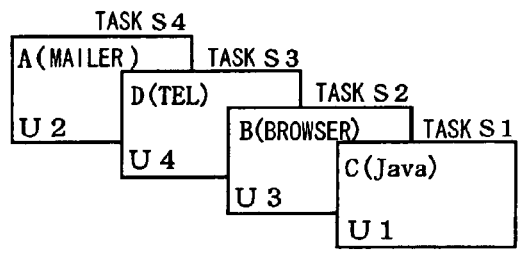
Figure 4:
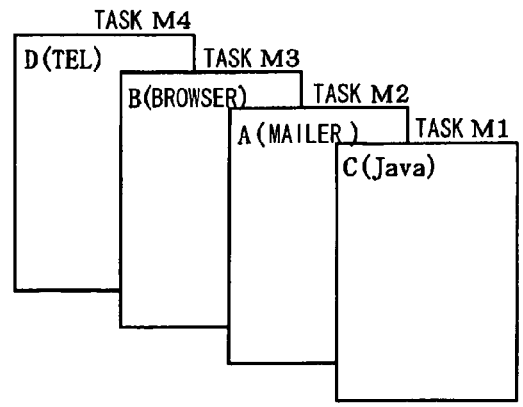
Figure 4:
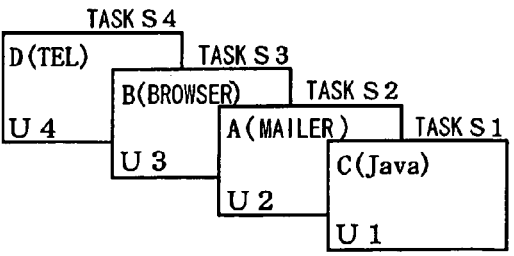
Figure 6:
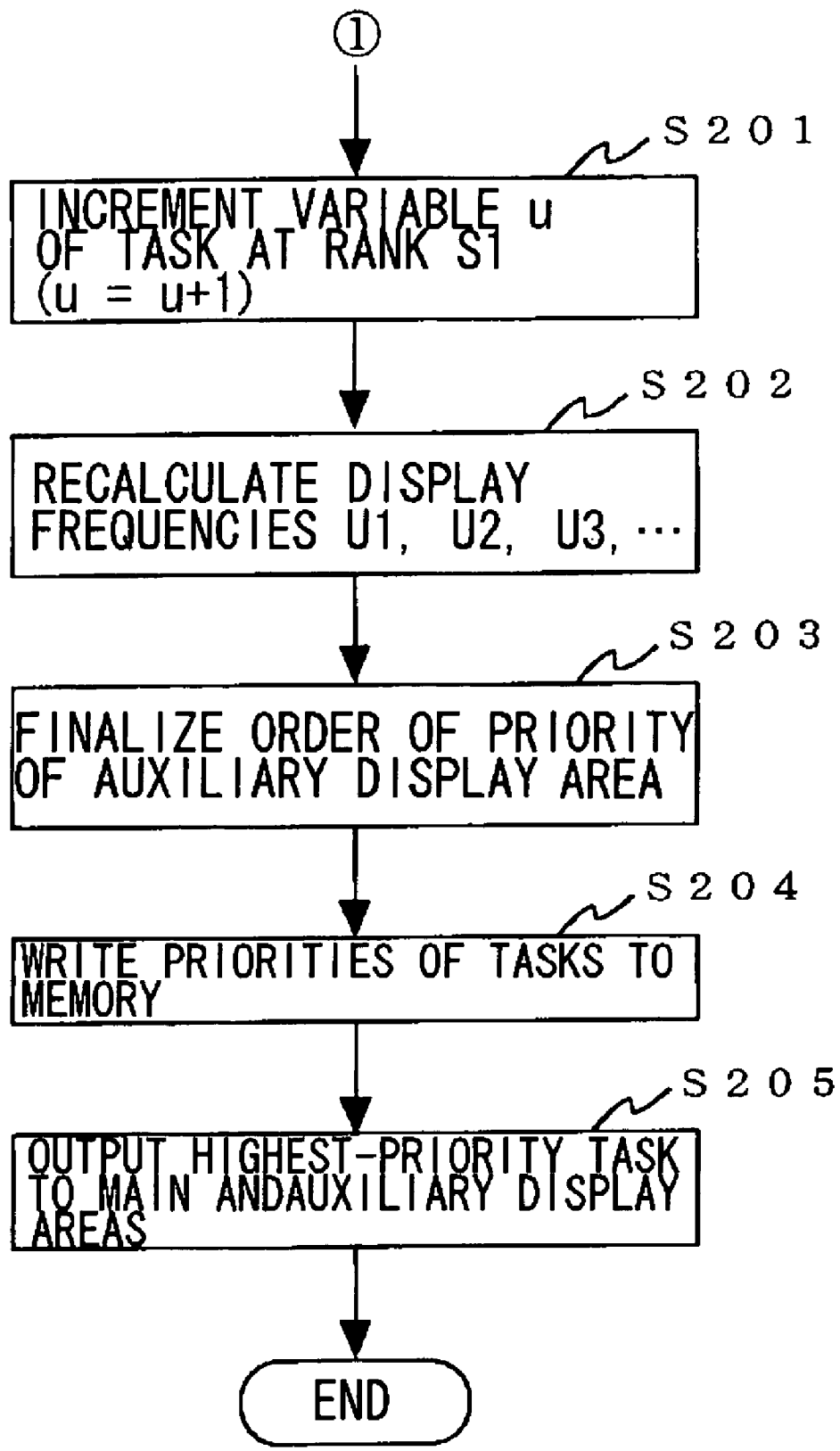
FIG. 6 is a flowchart illustrating an operating procedure according to this embodiment.

It should be noted that an embodiment relating to a display control program according to the present invention is implemented by storing a program, which implements control in accordance with the procedures shown in FIGS. 3 and 6, in the mobile telephone illustrated in FIG. 1 and having the controller 11 control the components of the mobile telephone in accordance with this program.

The meritorious effects of the present invention are summarized as follows.

Thus, as should be evident from the description rendered above, the same function can be selected as the function that presents a display on main display means and as the function that presents a display on auxiliary display means, whereby the content displayed on the main display means and the content displayed on the auxiliary display means can be operatively associated at all times. Accordingly, a function for which a display is being presented on the main display means is capable of utilizing the auxiliary display means, thereby making it possible to utilize the auxiliary display means effectively irrespective of whether the mobile telephone is open or closed.

Further, by assigning priorities to a plurality of functions separately for each of two display means, a display candidate having a high probability of being that sought by the user can be displayed quickly.

Further, if a function is selected by auxiliary operation input means, the priority of this selected function for display on the main display means is changed to the highest priority and display content that has been processed by the selected function is displayed on the main display means as well. This makes possible a use in which after the user checks the display content on the auxiliary display means, the user immediately checks the details of the same display content on the main display means.

Further, if a function is selected by the auxiliary operation input means, the selected function is counted, the priority of this selected function for display on the auxiliary display means is changed to the highest priority and the priorities of the other functions are assigned in accordance with the number of times they were selected in the past. As a result, a function for which display processing is executed for the auxiliary display means can be made the function having the highest frequency of display and a display candidate having a high probability of being that sought by the user can be displayed quickly.

Further, if a function is selected by auxiliary operation input means, the priority of this selected function for display on the auxiliary display means is changed to the highest priority and the priorities of the other functions are assigned in accordance with the lengths of their display times in the past. As a result, a function for which display processing is executed for the auxiliary display means can be made the function having the highest frequency of display and a display candidate having a high probability of being that sought by the user can be displayed quickly.

Further, by making the rule that decides the priorities of displays presented on the auxiliary display means as independent as possible from the rule that decides the priorities of displays presented on the main display means, it is possible for concurrent use to be made of other priority deciding rules regarding the main display means. This provides a high degree of universality.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A mobile telephone comprising:
   main display means and auxiliary display means; and
   control means for executing processing based upon a program that has been stored in said mobile telephone to thereby implement a plurality of functions;
   wherein display content that is the result of processing by the same function is displayed on both said main display means and said auxiliary display means, and
   wherein said control means exercises control so as to assign priorities to the plurality of functions separately for each of said main and auxiliary display means, thereby managing functions that process display content displayed on said main and auxiliary display means.

2. The mobile telephone according to claim 1, wherein said control means exercises control so as to:
   present displays in order starting from display content that has been processed by a function having the highest priority.

3. The mobile telephone according to claim 2, further comprising auxiliary operation input means capable of selecting a function that processes display content displayed on said auxiliary display means;

wherein said control means exercises control in such a manner that if a function is selected by said auxiliary operation input means, the priority of this selected function for display on said main display means is changed to the highest priority and display content that has been processed by this selected function is displayed also on said main display means.

4. The mobile telephone according to claim 3, wherein said control means exercises control so as to count, for each of the plurality of functions, the number of times the function has been selected by said auxiliary operation input means, and change the priority for presentation of displays on the auxiliary display means in accordance with the number of times the function has been selected.

5. The mobile telephone according to claim 4, wherein said control means exercises control so as to:
count, for each of the plurality of functions, the number of times the function has been selected by said auxiliary operation input means; and
if a function is selected by said auxiliary operation input means, count the selected function, change the priority of this selected function for display on said auxiliary display means to the highest priority and assign the priorities of the other functions in accordance with the number of times the function has been selected.

6. The mobile telephone according to claim 4, further comprising main operation input means capable of selecting a function that processes display content displayed on said main display means;
wherein said control means exercises control so as to:
count, for each of the plurality of functions, the number of times the function has been selected by said main operation input means; and
if a function is selected by said main operation input means, change the priority of this selected function for display on said auxiliary display means to the highest priority and assign the priorities of the other functions in accordance with the number of times the function has been selected.

7. The mobile telephone according to claim 3, wherein said control means exercises control so as to measure, for each of the plurality of functions, display time during which display content that has been processed by the function is displayed on said auxiliary display means, and change the priority for presentation of displays on the auxiliary display means in accordance with the display time measured.

8. The mobile telephone according to claim 7, wherein said control means exercises control so as to:
measure, for each of the plurality of functions, display time during which display content that has been processed by the function is displayed on said auxiliary display means; and
if a function is selected by said auxiliary operation input means, change the priority of this selected function for display on said auxiliary display means to the highest priority and assign the priorities of the other functions in accordance with the display time measured.

9. The mobile telephone according to claim 7, further comprising main operation input means capable of selecting a function that processes display content displayed on said main display means;
wherein said control means exercises control so as to:
measure, for each of the plurality of functions, measure, display time during which display content that has been processed by the function is displayed on said auxiliary display means; and
if a function is selected by said main operation input means, change the priority of this selected function for display on said auxiliary display means to the highest priority and assign the priorities of the other functions in accordance with the display time measured.

10. A method of controlling display on a mobile telephone having main display means, auxiliary display means and control means for executing processing based upon a program that has been stored in said mobile telephone to thereby implement a plurality of functions, said method comprising a control step of exercising control in such a manner that display content that is the result of processing by the same function is displayed on both the main display means and the auxiliary display means,
wherein said control step includes a step of exercising control so as to assign priorities to the plurality of functions separately for each of the main and auxiliary display means, thereby managing functions that process display content displayed on the main and auxiliary display means.

11. The method according to claim 10, wherein said control step includes a step of exercising control so as to:
present displays in order starting from display content that has been processed by a function having the highest priority.

12. The method according to claim 11, wherein said control step includes a step of exercising control in such a manner that if a function that processes display content displayed on the auxiliary display means is selected by input means, the priority of this selected function for display on the main display means is changed to the highest priority and display content that has been processed by this selected function is displayed also on the main display means.

13. The method according to claim 12, wherein said control step includes a step of exercising control so as to count, for each of the plurality of functions, the number of times the function has been selected by the input means, and change the priority for presentation of displays on the auxiliary display means in accordance with the number of times the function has been selected.

14. The method according to claim 13, wherein said control step includes a step of exercising control so as to:
count, for each of the plurality of functions, the number of times the function has been selected by the input means; and
if a function is selected by the input means, count the selected function, change the priority of this selected function for display on the auxiliary display means to the highest priority and assign the priorities of the other functions in accordance with the number of times the function has been selected.

15. The method according to claim 13, wherein said control step includes a step of exercising control so as to:
count, for each of the plurality of functions, the number of times a function that processes display content displayed on the auxiliary display means has been selected; and
if a function that processes display content displayed on the main display means is selected, change the priority of this selected function for display on the auxiliary display means to the highest priority and assign the priorities of the other functions in accordance with the number of times the function has been selected.

16. The method according to claim 12, wherein said control step includes a step of exercising control so as to measure, for each of the plurality of functions, display time during which display content that has been processed by the function is displayed on the auxiliary display means, and change the priority for presentation of displays on the auxiliary display means in accordance with the display time measured.

17. The method according to claim 16, wherein said control step includes a step of exercising control so as to:
- measure, for each of the plurality of functions, display time during which display content that has been processed by the function is displayed on the auxiliary display means; and
- if a function is selected by the input means, change the priority of this selected function for display on the auxiliary display means to the highest priority and assign the priorities of the other functions in accordance with the display time measured.

18. The method according to claim 16, wherein said control step includes a step of exercising control so as to:
- measure, for each of the plurality of functions, display time during which display content that has been processed by the function is displayed on the auxiliary display means; and
- if a function that processes display content displayed on the main display means is selected, change the priority of this selected function for display on the auxiliary display means to the highest priority and assign the priorities of the other functions in accordance with the display time measured.

19. A display control program for controlling display on a mobile telephone having main display means, auxiliary display means and control means for executing processing based upon a program that has been stored in said mobile telephone to thereby implement a plurality of functions, said display control program implementing control in such a manner that display content that is the result of processing by the same function is displayed on both the main display means and the auxiliary display means,
- wherein said program includes program code for implementing control so as to assign priorities to the plurality of functions separately for each of the main and auxiliary display means, thereby managing functions that process display content displayed on the main and auxiliary display means.

20. The program according to claim 19, wherein said program includes program code for implementing control so as to:
- present displays in order starting from display content that has been processed by a function having the highest priority.

21. The program according to claim 20, wherein said program includes program code for implementing control in such a manner that if a function that processes display content displayed on the auxiliary display means is selected by input means, the priority of this selected function for display on the main display means is changed to the highest priority and display content that has been processed by this selected function is displayed also on the main display means.

22. The program according to claim 21, wherein said program includes program code for implementing control so as to count, for each of the plurality of functions, the number of times the function has been selected by the input means, and change the priority for presentation of displays on the auxiliary display means in accordance with the number of times the function has been selected.

23. The program according to claim 22, wherein said program includes program code for implementing control so as to:
- count, for each of the plurality of functions, the number of times a function that processes display content displayed on the auxiliary display means has been selected; and
- if a function that processes display content displayed on the main display means is selected, change the priority of this selected function for display on the auxiliary display means to the highest priority and assign the priorities of the other functions in accordance with the number of times the function has been selected.

24. The program according to claim 21, wherein said program includes program code for implementing control so as to measure, for each of the plurality of functions, display time during which display content that has been processed by the function is displayed on the auxiliary display means, and change the priority for presentation of displays on the auxiliary display means in accordance with the display time measured.

25. The program according to claim 24, wherein said program includes program code for implementing control so as to:
- measure, for each of the plurality of functions, display time during which display content that has been processed by the function is displayed on the auxiliary display means; and
- if a function is selected by the input means, change the priority of this selected function for display on the auxiliary display means to the highest priority and assign the priorities of the other functions in accordance with the display time measured.

26. The program according to claim 24, wherein said program includes program code for implementing control so as to:
- measure, for each of the plurality of functions, display time during which display content that has been processed by the function is displayed on the auxiliary display means; and
- if a function that processes display content displayed on the main display means is selected, change the priority of this selected function for display on the auxiliary display means to the highest priority and assign the priorities of the other functions in accordance with the display time measured.

27. The program according to claim 22, wherein said program includes program code for implementing control so as to:
- count, for each of the plurality of functions, the number of times the function has been selected by the input means; and
- if a function is selected by the input means, count the selected function, change the priority of this selected function for display on the auxiliary display means to the highest priority and assign the priorities of the other functions in accordance with the number of times the function has been selected.

* * * * *

UNITED STATES PATENT AND TRADEMARK OFFICE
CERTIFICATE OF CORRECTION

PATENT NO. : 7,187,951 B2  Page 1 of 1
APPLICATION NO. : 10/803942
DATED : March 6, 2007
INVENTOR(S) : Sou Kaida It is certified that error appears in the above-identified patent and that said Letters Patent is hereby corrected as shown below:

Claim 16, column 12, line 61, after "to" insert -- : --

Claim 16, column 12, line 65, after "and" insert -- if a function is selected by input means, --

Signed and Sealed this

Fourth Day of November, 2008

JON W. DUDAS
*Director of the United States Patent and Trademark Office*